United States Patent
Walker et al.

(10) Patent No.: US 9,665,920 B1
(45) Date of Patent: May 30, 2017

(54) SIMULTANEOUS EXECUTION OF COMPUTE AND GRAPHICS APPLICATIONS

(75) Inventors: Chad D. Walker, Cary, NC (US); Rui M. Bastos, Porto Alegre (BR); Narayan Kulshrestha, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1240 days.

(21) Appl. No.: 12/641,232

(22) Filed: Dec. 17, 2009

Related U.S. Application Data

(60) Provisional application No. 61/248,833, filed on Oct. 5, 2009.

(51) Int. Cl.
| | | |
|---|---|---|
| *G06T 1/20* | (2006.01) | |
| *G06T 1/60* | (2006.01) | |
| G06F 9/54 | (2006.01) | |
| G06T 15/00 | (2011.01) | |

(52) U.S. Cl.
CPC .......... *G06T 1/20* (2013.01); *G06T 1/60* (2013.01); *G06F 9/544* (2013.01); *G06T 15/005* (2013.01)

(58) Field of Classification Search
None
See application file for complete search history.

(56) References Cited

U.S. PATENT DOCUMENTS

| 7,752,340 B1* | 7/2010 | Porat et al. ............... 710/5 |
|---|---|---|
| 2008/0184211 A1* | 7/2008 | Nickolls .......... G06F 8/456 717/140 |
| 2009/0251474 A1* | 10/2009 | Chou et al. ............ 345/522 |
| 2011/0050713 A1* | 3/2011 | McCrary et al. ........ 345/522 |

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.

* cited by examiner

*Primary Examiner* — Tize Ma
(74) *Attorney, Agent, or Firm* — Artegis Law Group, LLP

(57) ABSTRACT

One embodiment of the present invention sets forth a technique for distributing graphics commands and atomic commands to a color processing unit (CROP) in an efficient manner. The interleaving mechanism determines, at each clock cycle, which graphics command(s) or atomic command(s) is transmitted to the CROP based on different factors. First, the interleaving mechanism ensures that atomic commands or graphics commands associated with a multi-transaction command stream are processed together. Second, the interleaving mechanism selects consecutive graphics commands for transmission to the CROP that optimize the use of different memory caches. Third, the interleaving mechanism prioritizes atomic commands over graphics commands. At each clock cycle, the graphics command(s) or the atomic command(s) selected by the interleaving mechanism are transmitted to the CROP for processing.

21 Claims, 10 Drawing Sheets

SIMULTANEOUS EXECUTION OF COMPUTE AND GRAPHICS APPLICATIONS

CROSS-REFERENCE TO RELATED APPLICATIONS

This application claims benefit of the United States provisional patent application titled, "Simultaneous Execution of Compute and Graphics Applications," filed on Oct. 5, 2009 and having Ser. No. 61/248,833, which is hereby incorporated herein by reference.

BACKGROUND OF THE INVENTION

Field of the Invention

The present invention relates generally to the field of graphics processing and, more specifically, to the simultaneous execution of compute and graphics applications.

Description of the Related Art

A graphics processing unit (GPU) is a specialized processor that is configured to efficiently process complex graphics and other numerical computations. Each GPU has several on-chip hardware components, such as memory caches and logic operations units, configured to efficiently perform the graphics and numerical computations. In typical computing systems, graphics processing and other computationally-intensive operations are off-loaded by the central processing unit (CPU) to the GPU.

Operations performed by the GPU often include graphics operations as well as atomic transactions associated with specific memory locations. An atomic transaction associated with a memory location is a type of read-modify-write (RMW) operation. In an RMW operation, the value stored in the associated memory location is read and modified based on a computation operation and then the modified value is written back at the associated memory location. When the atomic transaction is in progress, the memory state of the associated memory location is preserved until that atomic transaction is complete.

To ensure that both graphics operations and atomic transactions are processed efficiently, typical GPUs include dedicated hardware units for executing atomic transactions and graphics operations separately. However, one drawback of such hardware design is that area on the GPU chip is consumed by each dedicated hardware unit which only executes atomic transactions or graphics operations. Therefore, to achieve acceptable throughput of graphics operations and atomic transactions, a large portion of the area available on the GPU chip is required to include several such dedicated hardware units.

As the foregoing illustrates, what is needed in the art is a mechanism for processing atomic transactions and graphics operations with high throughput without consuming a significant portion of area available on the GPU chip.

SUMMARY OF THE INVENTION

One embodiment of the present invention sets forth a method for transmitting commands to a processing subsystem that is configured to perform both color blending operations and atomic operations. The method includes the steps of determining that a graphics command buffer includes one or more graphics commands and that an atomic command buffer includes one or more atomic commands, selecting a first graphics command from the graphics command buffer or a first atomic command from the atomic command buffer for transmission to the processing subsystem based on one or more selection criteria, and unblocking a graphics command path to the processing subsystem when the first graphics command is selected for transmission, or unblocking an atomic command path to the processing subsystem when the first atomic command is selected for transmission.

One advantage of the techniques described herein is that both atomic commands and graphics commands are distributed to the color raster operations unit (CROP) in an efficient manner. Such a technique allows for the optimal use of the processing power of the CROP as well as the different memory caches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
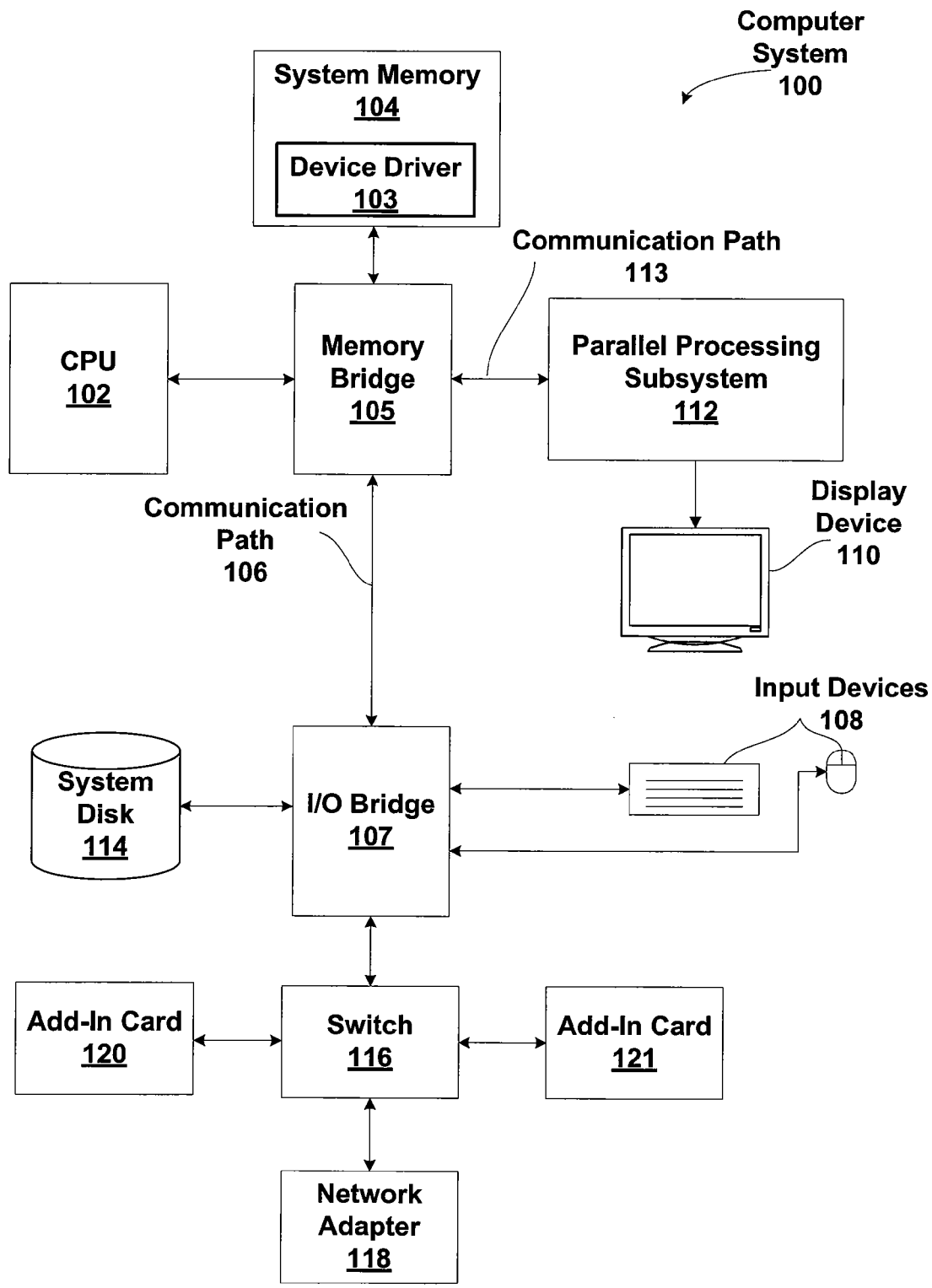
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
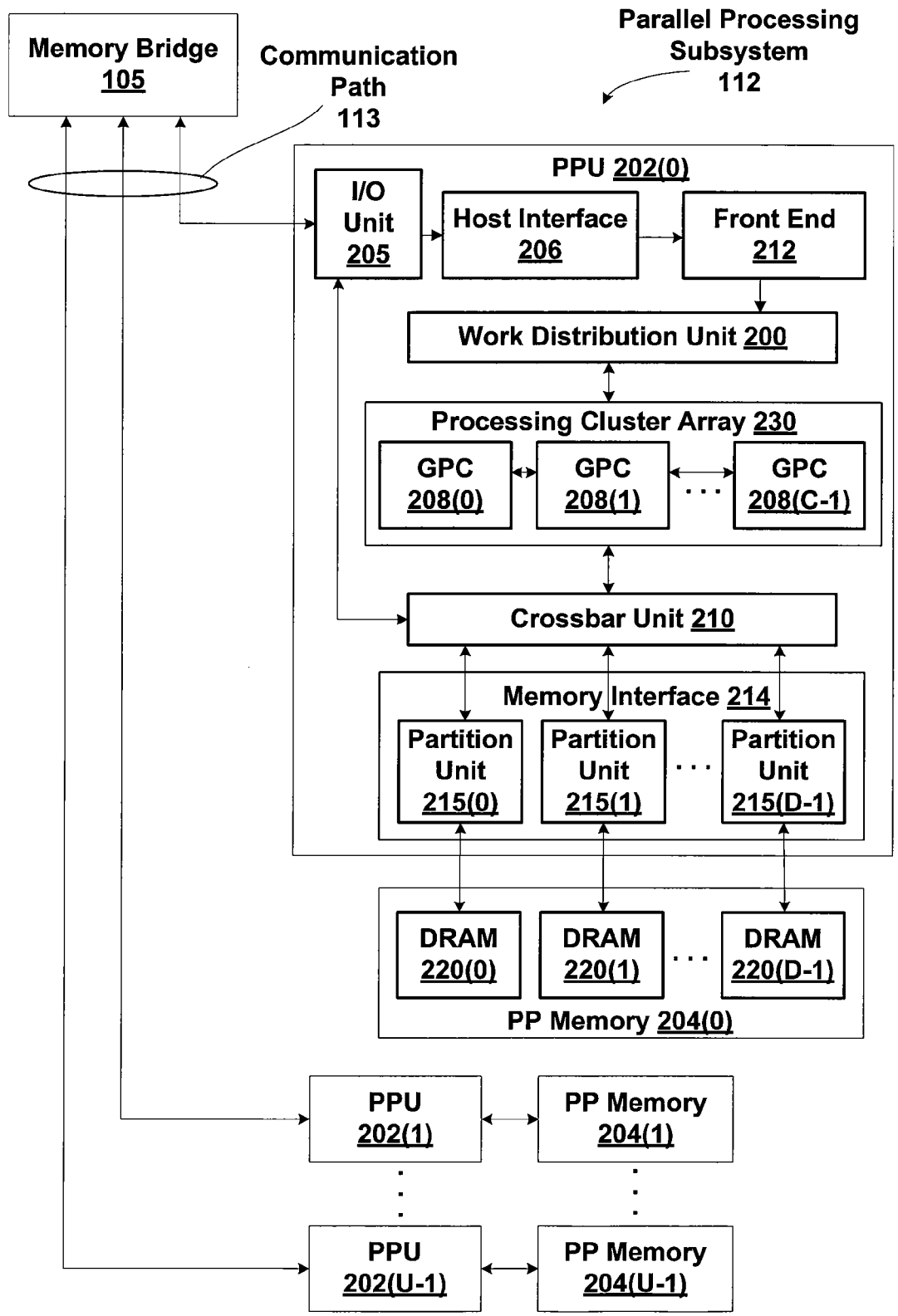
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
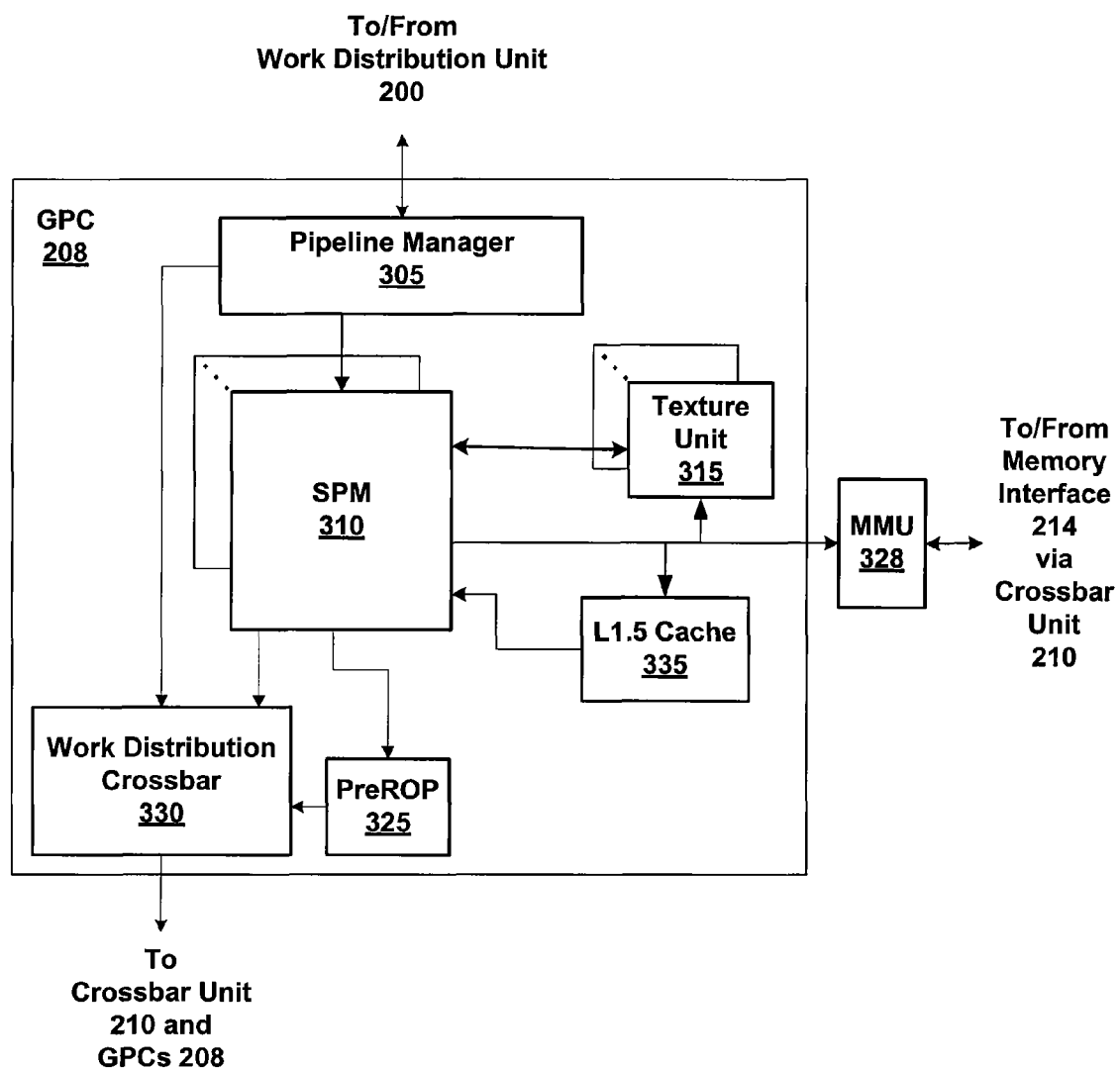
FIG. 3A is a block diagram of a general processing cluster (GPC) within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CIA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
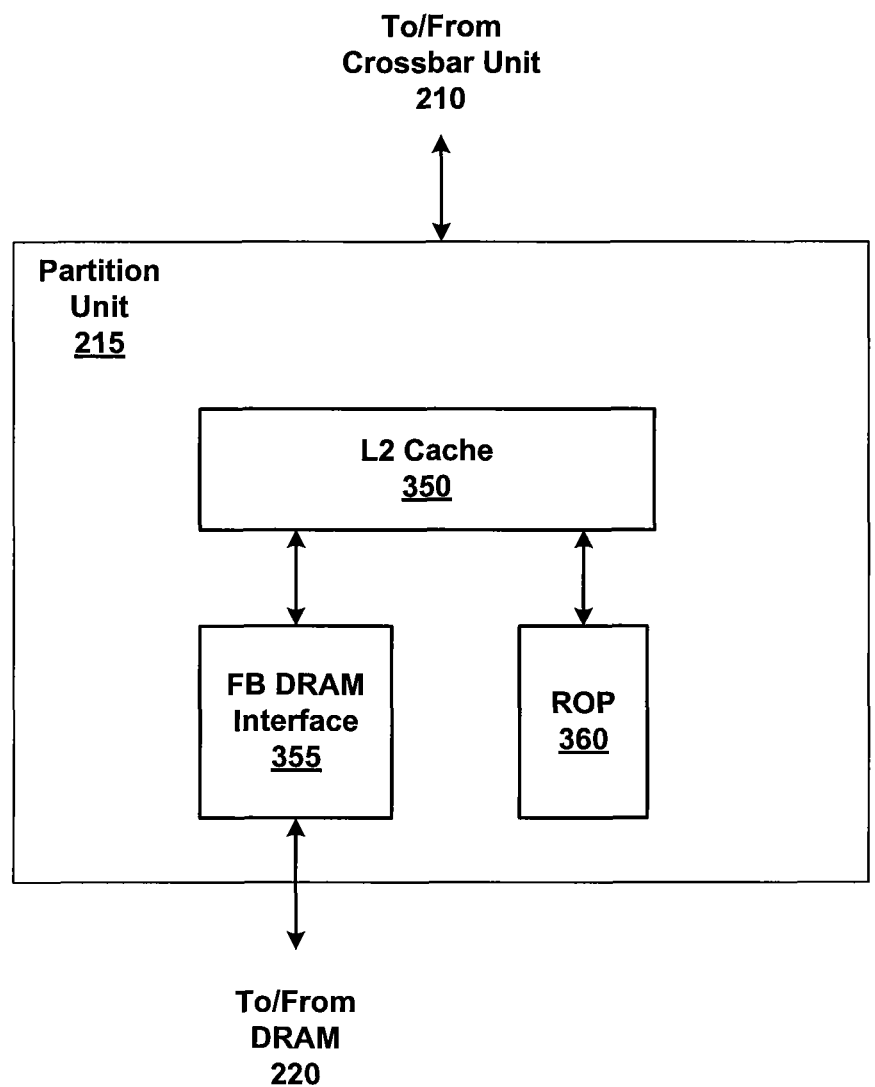
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
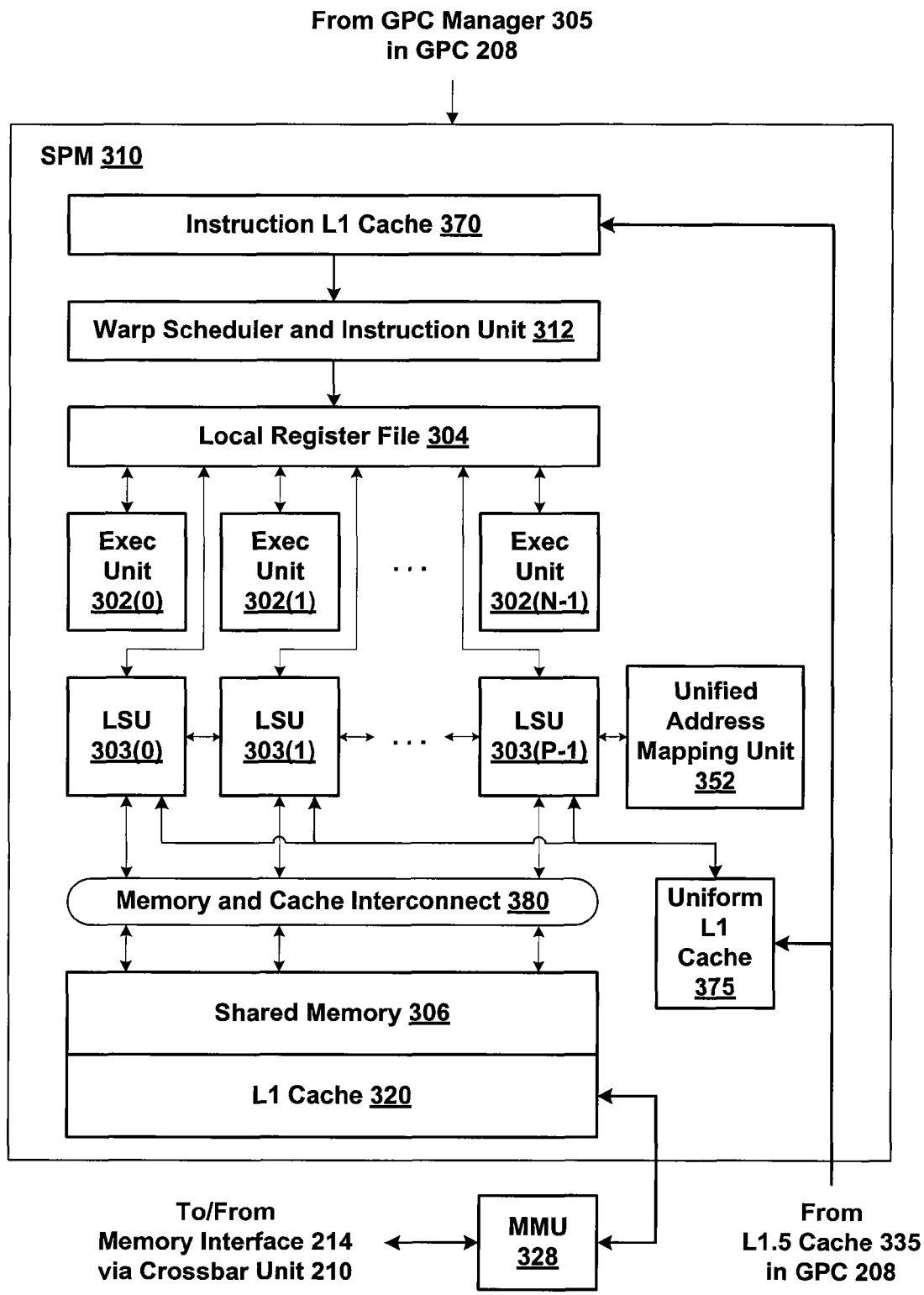
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CIA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Interleaving Atomic Commands and Graphics Commands

Figure 4:
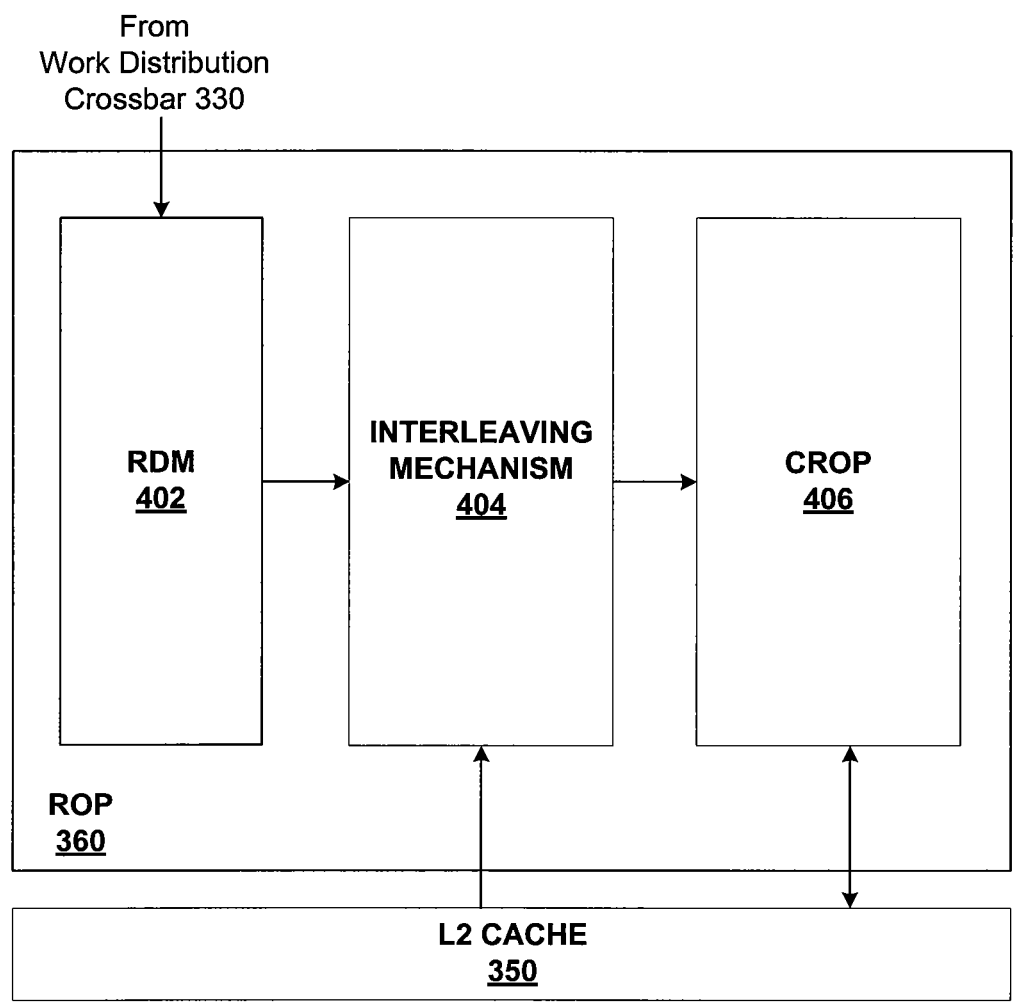
FIG. 4 is a detailed block diagram of the ROP of FIG. 3B, according to one embodiment of the present invention.

FIG. 4 is a detailed block diagram of the ROP 360 of FIG. 3B, according to one embodiment of the present invention. As shown, the ROP 360 includes a ROP data manager (RDM) 402, an interleaving mechanism 404 and a color raster operations unit (CROP) 406.

In operation, the CROP 406 processes both color raster operations and atomic transactions based on commands and data received from the RDM 402 and the L2 cache 350 via the interleaving mechanism 404. In the case of color raster operations, the GPC 208 transmits graphics commands associated with specific memory locations within the L2 cache 350 to the RDM 402. The RDM 402 then transmits the graphics commands to the CROP 406 via the interleaving mechanism 404 for processing. When processing color raster operations, the CROP 406 performs blending operations on the pixel data retrieved from the L2 cache 350 based on the corresponding graphics commands.

In the case of atomic transactions, the GPC 208 transmits atomic commands to the L2 cache 350. The L2 cache 350 then transmits the atomic commands to the CROP 406 via the interleaving mechanism 404 for processing. As is well-known, most atomic commands are read-modify-write operations where a memory location is read, the value stored in the memory location is processed, and the resulting value is stored in the same memory location, overwriting the value from the memory location. While an atomic command is being processed, the memory location is locked and cannot be accessed for reading data or writing data.

The GPC 208 transmits two types of atomic commands, atomic operations and reduction operations, to the interleaving mechanism 404 via the L2 cache unit 350 for processing within the CROP 406. An atomic operation transmitted by the GPC 208 typically includes one or more source data units, a memory address associated with a memory location in the L2 cache unit 350 storing a destination data unit and an operation code specifying the type of atomic operation to be performed on the source and destination operands. With an atomic operation the result of the atomic operation is stored at the memory location associated with the memory address and the destination operand is returned to the GPC 208. A reduction operation transmitted by the GPC 208 is similar to an atomic operation except that the destination operand is not returned to the GPC 208.

Figure 5:
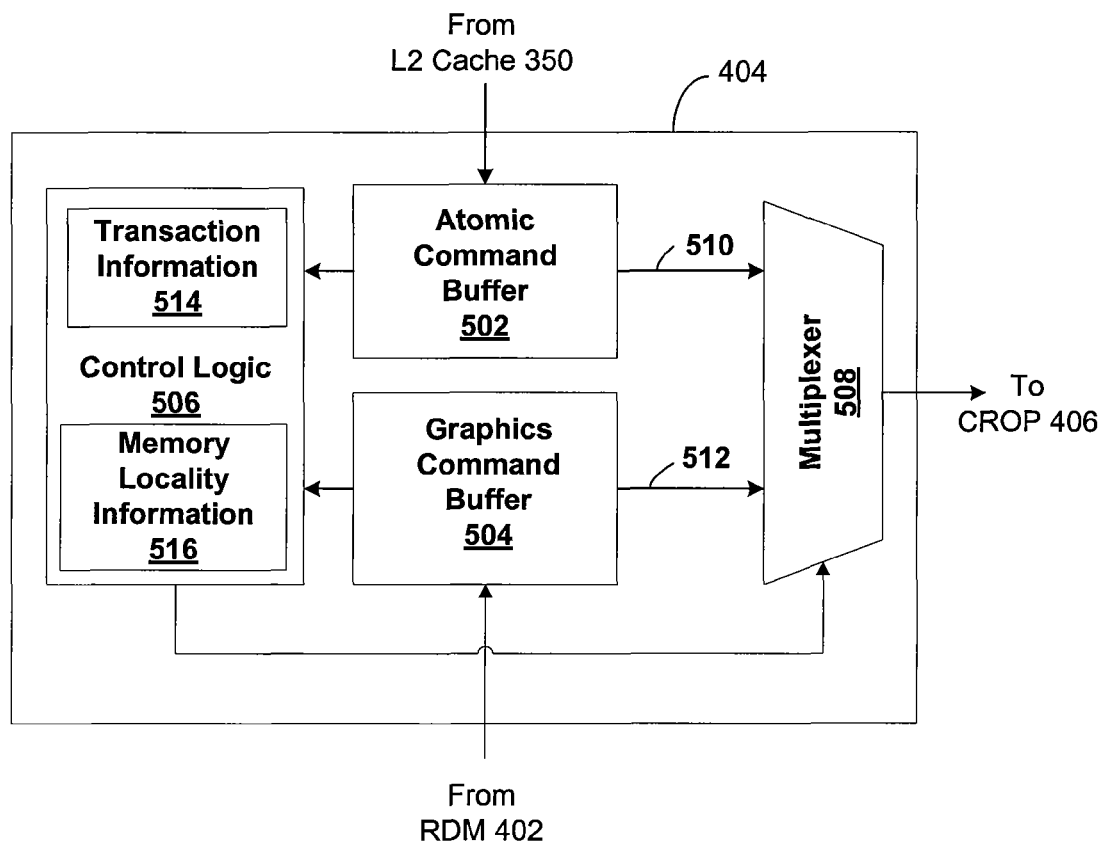
FIG. 5 is a detailed block diagram of the interleaving mechanism of FIG. 4 within the ROP, according to one embodiment of the present invention.

FIG. 5 is a detailed block diagram of the interleaving mechanism 404 of FIG. 4 within the ROP 360, according to one embodiment of the present invention. As shown, the interleaving mechanism 404 includes an atomic command buffer 502, a graphics command buffer 504, control logic 506, a multiplexer 508, an atomic command path 510 and a graphics command path 512. As also shown, the control logic 506 includes transaction information 514 and memory locality information 516.

The atomic command buffer 502 stores atomic commands received from the L2 cache 350 until those atomic commands can be distributed to the CROP 406 for processing. Similarly, the graphics command buffer 504 stores graphics commands received from the RDM 402, until those graphics commands can be distributed to the CROP 406 for processing. The control logic 506 tracks the atomic commands stored in the atomic command buffer 502 and the graphics commands stored in the graphics command buffer 504. As described in greater detail below, at each clock cycle, the control logic 506 selects one or more atomic commands or one or more graphics commands from their respective buffers for transmission to the CROP 406 based on various operating criteria.

First, the control logic 506 should ensure that atomic commands or graphics commands associated with a multi-transaction command stream are processed together. When a multi-transaction command stream is being transmitted, the control logic 506 stores information regarding the command stream in the transaction information 514. At each clock cycle, the control logic 506 selects one or more commands associated with the multi-transaction command stream for transmission to the CROP 406. Consequently, commands that are not associated with the multi-transaction command stream are not selected for transmission to the CROP 406 until the multi-transaction command stream is fully transmitted.

Second, the control logic 506 should select consecutive graphics commands for transmission to the CROP 406 that optimize the use of the L2 cache 350 and memory caches (not shown) within the CROP 406. The control logic 506 tracks the memory locality of graphics commands previously transmitted to the CROP 406 within the memory locality 516. Graphics commands associated with memory locations falling within the same memory locality are selected from transmission to the CROP 406 consecutively, even if atomic commands in the atomic buffer 502 waiting to be processed exist. Consecutively processing graphics commands having the same memory locality allows for optimum cache usage thereby increasing the efficiency of the L2 cache 350 and the memory caches within the CROP 406.

Third, the control logic 506 should prioritize either atomic commands or graphics commands based on configuration information. In one embodiment, where atomic commands are given a higher priority over graphics commands, at each clock cycle, an atomic command in the atomic command buffer 502 is selected for transmission unless (i) no more atomic commands remain in the atomic command buffer 502, (ii) a multi-transaction graphics command stream is being processed or (iii) a next graphics command is within the same memory locality as the previously transmitted graphics command. As previously described herein, the memory location within the L2 cache 350 associated with an atomic command is locked until the atomic command is fully processed by the CROP 406. By prioritizing atomic commands over graphics commands for transmission to the CROP 406, the control logic 506 decreases the period of time during which memory locations associated with those atomic commands are locked. In an alternative embodiment, where graphics commands are given a higher priority over atomic commands, at each clock cycle, a graphics command is selected for processing until no more graphics commands remain in the graphics command buffer 504.

Based on the above-mentioned criteria, the control logic 406 selects one or more atomic commands stored in the atomic command buffer 502 or one or more graphics commands stored in the graphics command buffer 504 for transmission to the CROP 406. If one or more atomic commands are selected for transmission to the CROP 406, then the control logic 506 indicates to the multiplexer 508 to unblock the atomic command path 510 and block the graphics command path 512. Similarly, if one or more graphics commands are selected for transmission to the CROP 406, then the control logic 506 indicates to the multiplexer 508 to unblock the graphics command path 512 and block the atomic command path 512. The multiplexer 508 then distributes commands received from the unblocked command path, either the atomic command path 510 or the graphics command path 512, to the CROP 406 for processing.

In other embodiments, the control logic 506 considers any number of factors, i.e., not necessarily three factors, when selecting atomic commands and graphics commands for transmission to the CROP 406. In such embodiments, the control logic 506 may also selects atomic commands and graphics commands for transmission based on any other technically feasible performance factors or functional requirements.

Figure 6A:
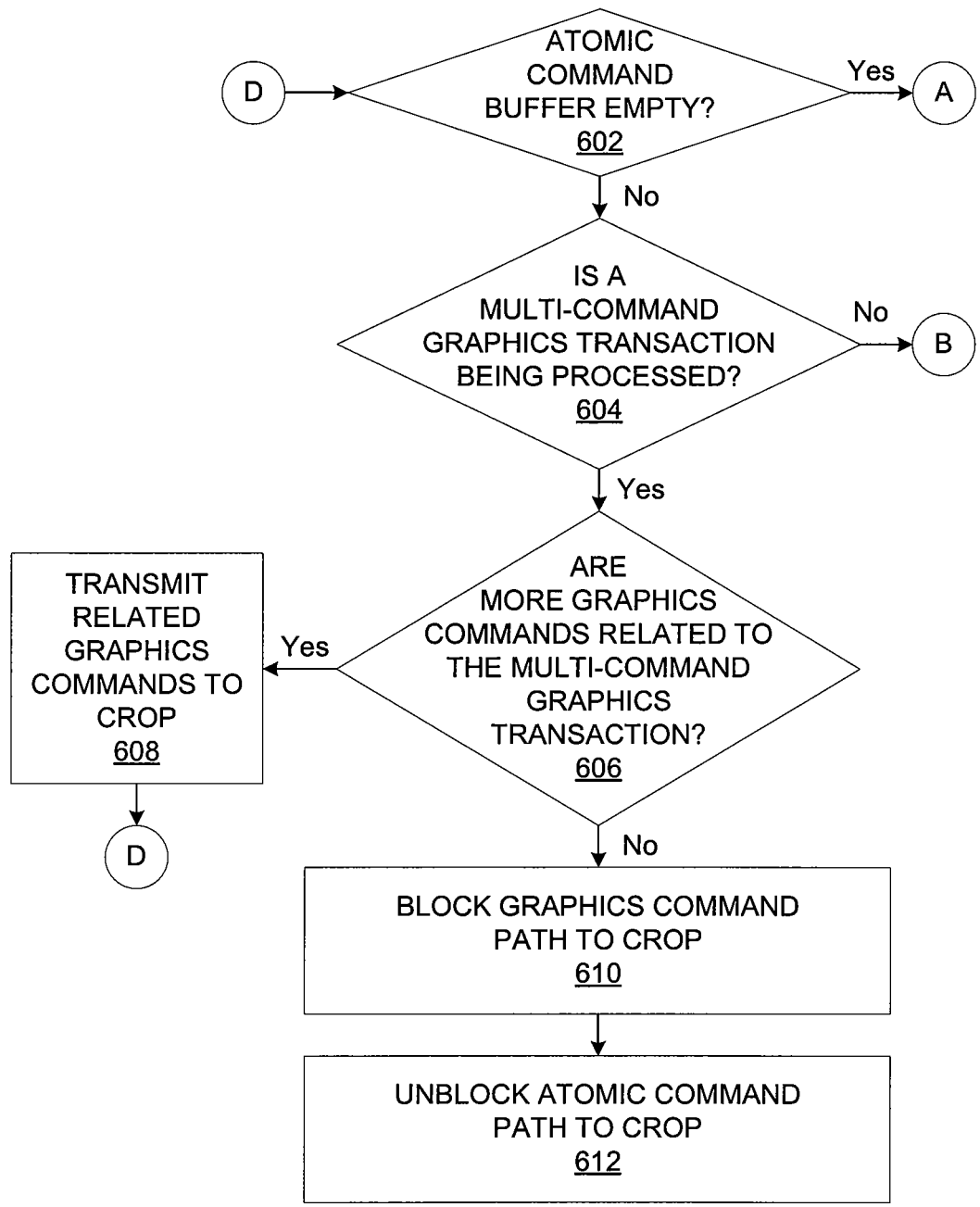
FIGS. 6A-6C set forth a flow diagram of method steps for interleaving the transmission of atomic commands and graphics commands to the CROP of FIG. 4, according to one embodiment of the present invention.
Figure 6B:
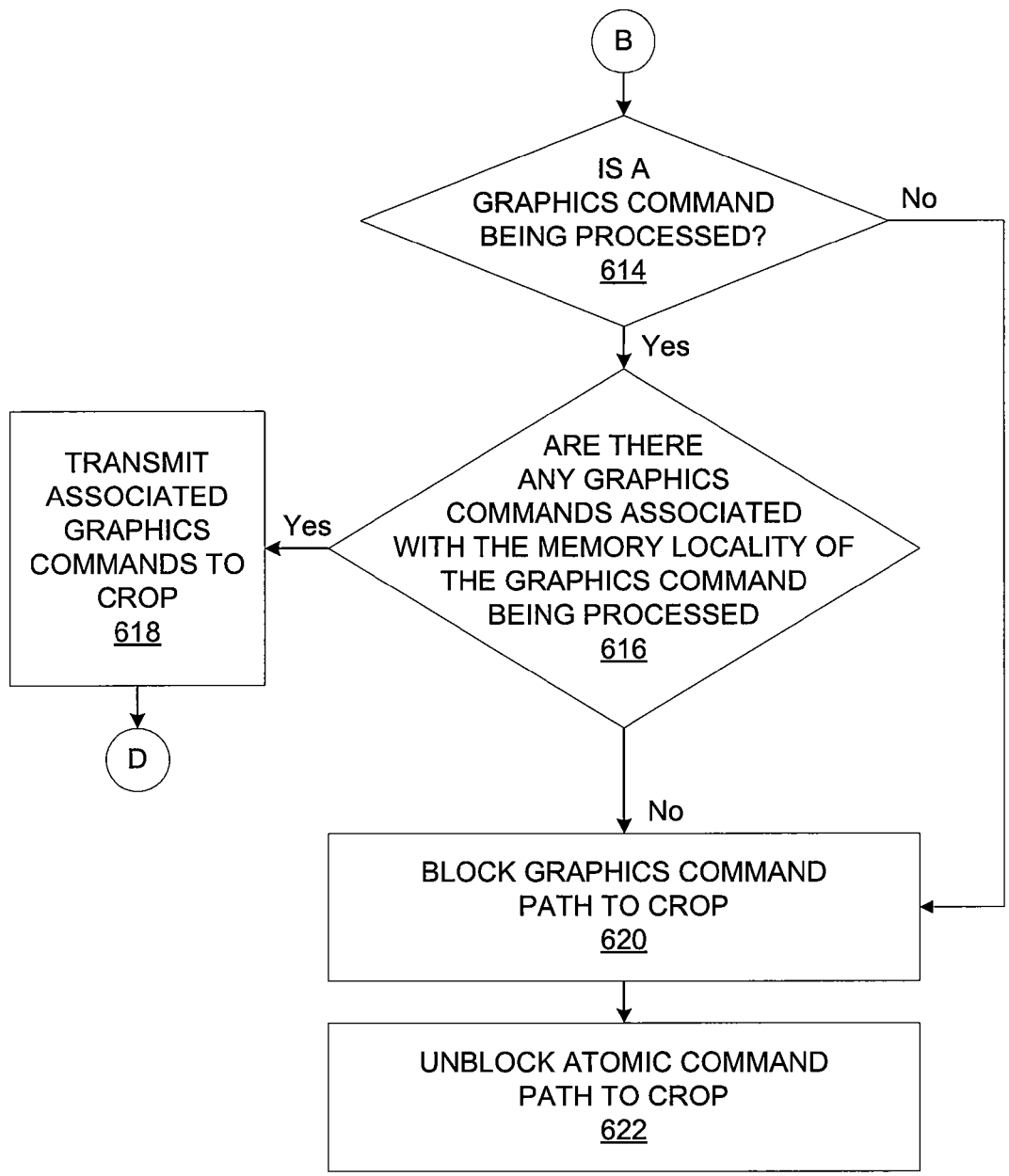
Figure 6C:
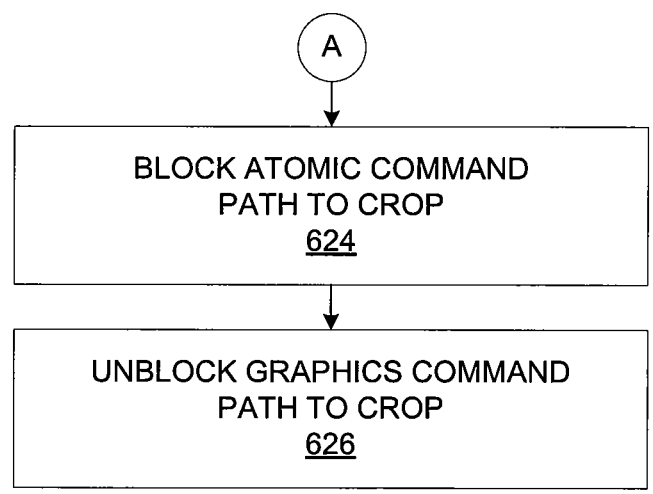

FIGS. 6A-6C set forth a flow diagram of method steps for interleaving the transmission of atomic commands and graphics commands to the CROP 406 of FIG. 4, according to one embodiment of the present invention. Although the method steps are described in conjunction with the systems for FIGS. 1-5, persons skilled in the art will understand that any system configured to perform the method steps, in any order, is within the scope of the invention.

The method 600 begins at step 602, where the control logic 506 determines whether the atomic command buffer 502 is empty. As previously described herein, the control logic 506 prioritizes atomic commands stored in the atomic command buffer 502 over graphics commands stored in the graphics command buffer 504. When the atomic command buffer 502 is not empty, the method 600 proceeds to step 604, where the control logic 506 determines whether a multi-transaction graphics command stream is being transmitted to the CROP 406 based on the transaction information 514. If a multi-transaction graphics command stream is being transmitted to the CROP 406, then the method proceeds to step 606.

At step 606, the control logic 506 determines whether more graphics commands associated with the multi-transaction graphics command stream exist in the graphics command buffer 504. If more associated graphics commands exist, then the method 600 proceeds to step 608, where the control logic 506 causes the associated graphics commands to be transmitted to the CROP 406 via the graphics command path 512 and the multiplexer 508. The method 600 then returns to step 602, previously described herein.

If, however, more associated graphics commands do not exist, then the method proceeds to step 610. At step 610, the control logic 506 indicates to the multiplexer 508 to block the graphics command path 512 so that no more graphics commands from the graphics command buffer 504 are transmitted to the CROP 406 via the multiplexer 508. At step 612, the control logic 506 indicates to the multiplexer 508 to unblock the atomic command path 510 so that atomic commands from the atomic command buffer 502 are transmitted to the CROP 406 via the multiplexer 508.

Referring back now to step 604, if a multi-transaction graphics command stream is not being transmitted to the CROP 406, then the method proceeds to step 614, where the control logic 506 determines whether the previously transmitted command was a graphics command. If the previously transmitted command was a graphics command, then the method 600 proceeds to step 616. At step 616, the control logic 506 determines whether any other graphics commands stored in the graphics command buffer 504 are associated with the same memory locality as the previously transmitted graphics command. If so, then at step 618, the control logic 506 causes the graphics commands associated with the same memory locality as the previously transmitted graphics command to be transmitted to the CROP 406 via the graphics command path 512 and the multiplexer 508. The method 600 then returns to step 602, previously described herein.

If, however, at step 616, graphics commands associated with the same memory locality as the previously transmitted graphics command more associated graphics commands do not exist, then the method proceeds to step 620. At step 620, the control logic 506 indicates to the multiplexer 508 to block the graphics command path 512 so that no more graphics commands from the graphics command buffer 504 are transmitted to the CROP 406 via the multiplexer 508. At step 622, the control logic 506 indicates to the multiplexer 508 to unblock the atomic command path 510 so that atomic commands from the atomic command buffer 502 are transmitted to the CROP 406 via the multiplexer 508.

Referring back now to step 602, if the atomic command buffer 502 is empty, them the method 600 proceeds to step 624. At step 624, the control logic 506 indicates to the multiplexer 508 to block the atomic command path 510 so that no more atomic commands from the atomic command buffer 502 are transmitted to the CROP 406 via the multiplexer 508. At step 626, the control logic 506 indicates to the multiplexer 508 to unblock the graphic command path 512 so that graphics commands from the graphics command buffer 504 are transmitted to the CROP 406 via the multiplexer 508. The method 600 then returns to step 602, previously described herein.

Although the method steps are described in conjunction with the systems of FIGS. 1, 2, 3A, 3B, and 3C, persons skilled in the art will understand that any system configured to perform the method steps, in any order, is within the scope of the inventions.

In sum, the CROP is configured to process both graphics commands and atomic commands. When distributing commands from the graphics command buffer and the atomic command buffer to the CROP, the interleaving mechanism determines, at each clock cycle, which graphics command(s) or atomic command(s) is transmitted to the CROP based on different factors. First, the interleaving mechanism ensures that atomic commands or graphics commands associated with a multi-transaction command stream are processed together. Second, the interleaving mechanism selects consecutive graphics commands for transmission to the CROP that optimize the use of the L2 cache and memory caches within the CROP. Third, the interleaving mechanism prioritizes atomic commands stored in the atomic command buffer over graphics commands stored in the graphics command buffer. At each clock cycle, the graphics command(s) or the atomic command(s) selected by the interleaving mechanism are transmitted to the CROP for processing.

One advantage of the techniques described herein is that both atomic commands and graphics commands are distributed to the CROP in an efficient manner. Such a technique allows for the optimal use of the processing power of the CROP as well as the different memory caches.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A method for transmitting commands to a processing subsystem that is configured to perform both color blending operations and atomic operations, the method comprising:
   determining that a graphics command buffer includes one or more graphics commands and that an atomic command buffer includes one or more atomic commands;
   selecting a first graphics command from the graphics command buffer or a first atomic command from the atomic command buffer for transmission to the processing subsystem based on one or more selection criteria, comprising:
      selecting the first graphics command when at least one of:
         the first graphics command is associated with a multi-transaction graphics command stream being processed by the processing subsystem, and
         the first graphics command is associated with a memory locality associated with a second graphics command being processed by the processing subsystem, or
      selecting the first atomic command when:
         the first graphics command is not associated with the multi-transaction graphics command stream, and
         the first graphics command is not associated with the memory locality associated with the second graphics command; and
   unblocking a graphics command path to the processing subsystem when the first graphics command is selected for transmission so that first graphics command can be transmitted to the processing subsystem, or
   unblocking an atomic command path to the processing subsystem when the first atomic command is selected for transmission so that first atomic command can be transmitted to the processing subsystem.

2. The method of claim 1, wherein the step of selecting the first graphics command or the first atomic command further comprises step of selecting the first graphics command for transmission to the processing subsystem when the first graphics command is associated with the multi-transaction graphics command stream.

3. The method of claim 2, further comprising the step of blocking the graphics command path to the processing subsystem after the first graphics command has been transmitted so that the first atomic command can be transmitted.

4. The method of claim 1, wherein the step of selecting the first graphics command or the first atomic command further comprises the step of selecting the first graphics command for transmission to the processing subsystem when the first graphics command is associated with the memory locality associated with the second graphics command.

5. The method of claim 1, wherein the step of selecting the first graphics command or the first atomic command further comprises the step of selecting the first graphics command when the first graphics command is not associated with the multi-transaction graphics command stream or the memory locality associated with the second graphics command and when configuration information indicates that graphics commands should be processed with a higher priority than atomic commands.

6. The method of claim 5, further comprising the steps of:
   selecting each of the remaining one or more graphics commands from the graphics command buffer for transmission to the processing subsystem, wherein the graphics command path to the processing subsystem remains unblocked while each of the remaining one or more graphics commands is selected and transmitted;
   selecting the first atomic command for transmission to the processing subsystem after each of the remaining one or more graphics commands has been transmitted to the processing subsystem via the graphics command path to the processing subsystem;
   blocking the graphics command path to the processing subsystem; and
   unblocking the atomic command path to the processing subsystem so that the first atomic command can be transmitted to the processing subsystem.

7. The method of claim 1, wherein the step of selecting the first graphics command or the first atomic command further comprises the step of selecting the first atomic command for transmission to the processing subsystem when the first graphics command is not associated with the multi-transaction graphics command stream or the memory locality associated with the second graphics command and when configuration information indicates that atomic commands should be processed with a higher priority than graphics commands.

8. The method of claim 7, further comprising the steps of:
   selecting each of the remaining one or more atomic commands from the atomic command buffer for transmission to the processing subsystem, wherein the atomic command path to the processing subsystem remains unblocked while each of the remaining one or more atomic commands is selected and transmitted;
   selecting the first graphics command for transmission to the processing subsystem after each of the remaining one or more atomic commands has been transmitted to the processing subsystem via the atomic command path to the processing subsystem;
   blocking the atomic command path to the processing subsystem; and unblocking the graphics command path to the processing subsystem so that the first graphics command can be transmitted to the processing subsystem.

9. The method of claim 1, further comprising:
determining that atomic commands have a higher priority than graphics commands;
determining whether a graphics command is being processed by the processing subsystem; and
selecting the first atomic command for transmission to the processing subsystem when no graphics command is currently being processed by the processing subsystem.

10. The method of claim 9, further comprising:
determining whether the first graphics command is associated with a multi-transaction graphics command stream being processed by the processing subsystem; and
selecting the first atomic command for transmission to the processing subsystem when a graphics command is being processed by the processing subsystem that is not associated with a multi-transaction graphics command stream.

11. The method of claim 1, wherein the first graphics command and a second graphics command have the same memory locality with respect to a cache memory associated with the processing subsystem.

12. A raster operations processor, comprising:
a processing subsystem that is configured to perform both color blending operations and atomic operations;
an interleaving mechanism comprising an atomic command buffer and a graphics command buffer and configured to:
  determine that the graphics command buffer includes one or more graphics commands and that the atomic command buffer includes one or more atomic commands;
  select a first graphics command from the graphics command buffer or a first atomic command from the atomic command buffer for transmission to the processing subsystem based on one or more selection criteria, comprising:
    selecting the first graphics command when at least one of:
      the first graphics command is associated with a multi-transaction graphics command stream being processed by the processing subsystem, and
      the first graphics command is associated with a memory locality associated with a second graphics command being processed by the processing subsystem, or
    selecting the first atomic command when:
      the first graphics command is not associated with the multi-transaction graphics command stream, and
      the first graphics command is not associated with the memory locality associated with the second graphics command; and
  unblock a graphics command path to the processing subsystem when the first graphics command is selected for transmission so that first graphics command can be transmitted to the processing subsystem, or
  unblock an atomic command path to the processing subsystem when the first atomic command is selected for transmission so that first atomic command can be transmitted to the processing subsystem.

13. The raster operations processor of claim 12, wherein the interleaving mechanism is further configured to select the first graphics command for transmission to the processing subsystem when the first graphics command is associated with the multi-transaction graphics command stream.

14. The raster operations processor of claim 13, wherein the interleaving mechanism is further configured to block the graphics command path to the processing subsystem after the first graphics command has been transmitted so that the first atomic command can be transmitted.

15. The raster operations processor of claim 12, wherein the interleaving mechanism is further configured to select the first graphics command for transmission to the processing subsystem when the first graphics command is associated with the memory locality associated with the second graphics command.

16. The raster operations processor of claim 12, wherein the interleaving mechanism is further configured to select the first graphics command when the first graphics command is not associated with the multi-transaction graphics command stream or the memory locality associated with the second graphics command and when configuration information indicates that graphics commands should be processed with a higher priority than atomic commands.

17. The raster operations processor of claim 16, wherein the interleaving mechanism is further configured to:
  select each of the remaining one or more graphics commands from the graphics command buffer for transmission to the processing subsystem, wherein the graphics command path to the processing subsystem remains unblocked while each of the remaining one or more graphics commands is selected and transmitted;
  select the first atomic command for transmission to the processing subsystem after each of the remaining one or more graphics commands has been transmitted to the processing subsystem via the graphics command path to the processing subsystem;
  block the graphics command path to the processing subsystem; and
  unblock the atomic command path to the processing subsystem so that the first atomic command can be transmitted to the processing subsystem.

18. The raster operations processor of claim 12, wherein the interleaving mechanism is further configured to select the first atomic command for transmission to the processing subsystem when the first graphics command is not associated with the multi-transaction graphics command stream or the memory locality associated with the second graphics command and when configuration information indicates that atomic commands should be processed with a higher priority than graphics commands.

19. The raster operations processor of claim 18, wherein the interleaving mechanism is further configured to:
  select each of the remaining one or more atomic commands from the atomic command buffer for transmission to the processing subsystem when configuration information indicates that atomic commands are higher priority than graphics commands, wherein the atomic command path to the processing subsystem remains unblocked while each of the remaining one or more atomic commands is selected and transmitted;
  select the first graphics command for transmission the processing subsystem after each of the remaining one or more atomic commands has been transmitted to the processing subsystem via the atomic command path to the processing subsystem;
  block the atomic command path to the processing subsystem; and unblock the graphics command path to the processing subsystem so that the first graphics command can be transmitted to the processing subsystem.

20. A computing system, comprising:

a processor;

a memory; and a raster operations processor coupled to the memory and including a graphics command buffer, an atomic command buffer, and a processing subsystem that is configured to perform both color blending operations and atomic operations, and configured to:

determine that the graphics command buffer includes one or more graphics commands and that the atomic command buffer includes one or more atomic commands;

select a first graphics command from the graphics command buffer or a first atomic command from the atomic command buffer for transmission to the processing subsystem based on one or more selection criteria, comprising:

selecting the first graphics command when at least one of:

the first graphics command is associated with a multi-transaction graphics command stream being processed by the processing subsystem, and the first graphics command is associated with a memory locality associated with a second graphics command being processed by the processing subsystem, or selecting the first atomic command when:

the first graphics command is not associated with the multi-transaction graphics command stream, and the first graphics command is not associated with the memory locality associated with the second graphics command; and unblock a graphics command path to the processing subsystem when the first graphics command is selected for transmission so that first graphics command can be transmitted to the processing subsystem, or unblock an atomic command path to the processing subsystem when the first atomic command is selected for transmission so that first atomic command can be transmitted to the processing subsystem.

21. A method for transmitting commands to a processing subsystem that is configured to perform both color blending operations and atomic operations, the method comprising:

determining that at least one of a graphics command buffer includes one or more graphics commands and an atomic command buffer includes one or more atomic commands;

selecting a first graphics command from the graphics command buffer or a first atomic command from the atomic command buffer for transmission to the processing subsystem based on one or more selection criteria, comprising:

determining that graphics commands have a higher priority than atomic commands, determining whether a graphics command is being processed by the processing subsystem, and selecting the first graphics command for transmission to the processing subsystem when the graphics command buffer includes at least one graphics command, or selecting the first atomic command for transmission to the processing subsystem when the graphics command buffer includes no graphics command; and unblocking a graphics command path to the processing subsystem when the first graphics command is selected for transmission so that first graphics command can be transmitted to the processing subsystem, or unblocking an atomic command path to the processing subsystem when the first atomic command is selected for transmission so that first atomic command can be transmitted to the processing subsystem.

* * * * *